UNITED STATES PATENT OFFICE.

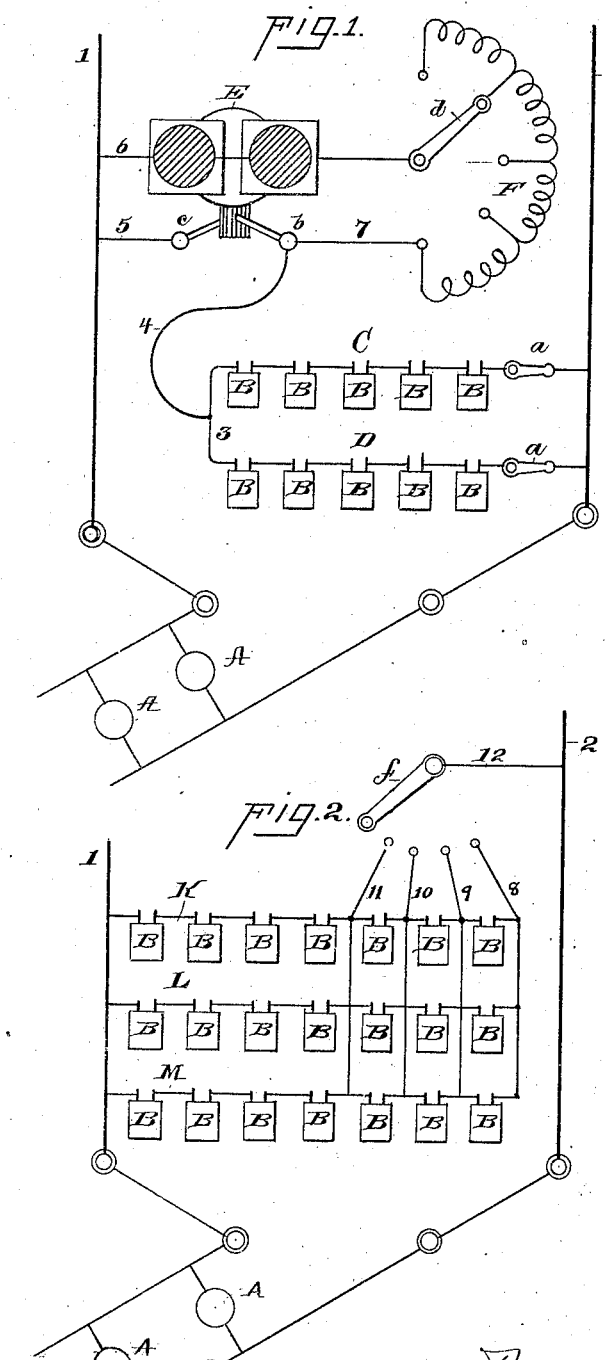

THOMAS A. EDISON, OF MENLO PARK, NEW JERSEY, ASSIGNOR TO THE EDISON ELECTRIC LIGHT COMPANY, OF NEW YORK, N. Y.

MEANS FOR CHARGING AND USING SECONDARY BATTERIES.

SPECIFICATION forming part of Letters Patent No. 435,687, dated September 2, 1890.

Application filed September 3, 1881. Serial No. 41,326. (No model.) Patented in England October 18, 1881, No. 4,553, and in France December 17, 1881, No. 145,736.

*To all whom it may concern:*

Be it known that I, THOMAS A. EDISON, of Menlo Park, in the County of Middlesex and State of New Jersey, have invented a new and useful Improvement in Secondary-Battery Systems, of which the following is a specification.

The object of my invention is to maintain constant the electro-motive force of secondary batteries or accumulators—that is, to reenforce their pressure as the same becomes lowered, when such batteries are used as a source of electricity for electric lights or other translating devices. To accomplish this I provide, in connection with the secondary batteries, an adjustable auxiliary source of electricity, and by connecting this source with the circuit and adjusting its electro-motive force at the proper times I maintain constant the current supplied from the batteries. Such auxiliary source may be a dynamo-electric generator provided with means for regulating its electromotive force, or it may be composed of auxiliary secondary cells provided with suitable switches for bringing them into circuit at the proper times.

My invention is illustrated in the accompanying drawings.

Figure 1 is a diagram illustrating my invention where a dynamo-electric machine is used. Fig. 2 is a diagram illustrating that form in which extra secondary cells are used.

Referring, first, to Fig. 1, C and D each represent a series of secondary cells or accumulators B B. These series of cells are connected in multiple arc with main conductors 1 2, with which conductors electric lamps or other translating devices A A are connected in multiple arc. The connection of the batteries with conductor 1 is made by means of conductors 4 and 5 through the armature of the dynamo-electric machine E, so that said machine is in series with the batteries. The field-magnet of the machine is preferably connected, as shown, through wires 6 and 7, in shunt to the armature. Said field-circuit contains a series of resistance-coils F, which are placed in or out of circuit by adjusting the pivoted switch-arm *d*. It will be understood that the cells are of such capacity that when charged they will give the required electro-motive force to operate the translating devices. The current from the cell B, passing to the main conductors 1 2, will pass through the armature of the generator E; but such generator is not operated while the electro-motive force of the battery remains practically constant, but upon a certain predetermined drop in the pressure from the main conductors, which may be shown by a suitable indicator provided for the purpose, the engine that drives the generator E is started while all the resistance-coils F are in the field-circuit. The generator thus causes to pass through the coils a weak current sufficient to re-enforce the battery current and to re-establish the desired pressure, although the batteries themselves will still supply the principal part of the current. When the indicator shows another drop of the current, the switch-arm *d* is moved to cut out part of the resistance of the field-circuit of the generator E, whereby the strength of its field-magnet will be increased and the electro-motive force of the generator will be raised and the current supplied to conductors 1 2 will be brought up again to the required pressure. Other sections of the resistance are cut out as required from time to time, the power of increase of the dynamo-electric machine being adapted for the work to be done, so that the electro-motive force can be maintained without fall the desired time. When the batteries are exhausted, they may be recharged and used over again in the same way. I prefer to provide each series of cells with a switch *a*, so that either or both of the series may be used at any time.

In the arrangement shown in Fig. 2 the secondary cells B are arranged in series K, L, and M, each series being connected independently of the others to main conductor 1. At the ends of the series they are connected together by cross-wires 8, 9, 10, and 11, each of which includes one more cell of each series than the next cross-wire to the left. The wires 8, 9, 10, and 11 terminate in suitable contact-plates with which a pivoted switch *f* makes contact, said switch being connected by a wire 12 with main conductor 2. At the beginning of the operation of the cells switch $f$ is in contact with wire 11 and the normal current is given by the cells on the left thereof. As the electro-motive force drops, contact is made successively with wires 10, 9, and 8, whereby additional cells are successively added to the series and the electro-motive force of each series is maintained practically constant.

It will be understood that the secondary cells B are charged in any suitable manner and are disconnected from the charging source before being used in connection with the translating devices.

I do not claim herein the specific arrangement illustrated in Fig. 2 of the drawings, since I propose to embody this in a separate application.

What I claim is—

1. The combination, with secondary batteries and translating devices supplied thereby, of a variable auxiliary source of electricity for re-enforcing said batteries as their electro-motive force decreases, substantially as set forth.

2. The combination, with secondary batteries and translating devices supplied thereby, of a dynamo-electric machine provided with means for regulating its electro-motive force for re-enforcing said batteries as their electro-motive force decreases, substantially as set forth.

3. The combination, with secondary batteries and translating devices supplied therefrom, of a dynamo-electric machine connected in series with said batteries and provided with means for regulating its electro-motive force for re-enforcing said batteries as their electro-motive force decreases, substantially as set forth.

This specification signed and witnessed this 21st day of June, 1881.

THOS. A. EDISON.

Witnesses:
WM. H. MEADOWCROFT,
MAURICE J. CLAGETT.